United States Patent
Bates

(10) Patent No.: US 8,801,111 B2
(45) Date of Patent: Aug. 12, 2014

(54) VEHICLE AIR BRAKING SYSTEM

(75) Inventor: Ian Richard Joseph Bates, Coventry (GB)

(73) Assignee: Wabco Automotive UK Limited, Morley Leeds (GB)

( * ) Notice: Subject to any disclaimer, the term of this patent is extended or adjusted under 35 U.S.C. 154(b) by 0 days.

(21) Appl. No.: 13/429,612

(22) Filed: Mar. 26, 2012

(65) Prior Publication Data

US 2012/0181851 A1  Jul. 19, 2012

Related U.S. Application Data

(63) Continuation of application No. 10/381,031, filed as application No. PCT/GB01/04132 on Sep. 14, 2001, now abandoned.

(30) Foreign Application Priority Data

Sep. 22, 2000 (GB) .................................. 0023350.2

(51) Int. Cl.
*B60T 17/00* (2006.01)
*B01D 53/26* (2006.01)

(52) U.S. Cl.
CPC ............... *B01D 53/26* (2013.01); *B60T 17/004* (2013.01)
USPC ............................................ 303/10; 303/127

(58) Field of Classification Search
USPC .......................... 303/10, 11, 127; 96/108, 115; 55/DIG. 17
See application file for complete search history.

(56) References Cited

U.S. PATENT DOCUMENTS

| 1,965,070 A | 7/1934 | Cumming |
| 4,487,617 A | 12/1984 | Dienes et al. |
| 4,504,081 A | 3/1985 | Shimizu et al. |
| 4,809,957 A | 3/1989 | Schonfeld et al. |
| 5,145,495 A | 9/1992 | Elamin |

(Continued)

FOREIGN PATENT DOCUMENTS

| DE | 31 39 683 A | 4/1983 |
| DE | 31 39 682 A | 5/1983 |

(Continued)

OTHER PUBLICATIONS

Patent Abstracts of Japan vol. 009, No. 179 (M-399), Jul. 24, 1985 & JP 60 049107 A (Nippon Air Brake KK), Mar. 18, 1985 Abstract; Figure.

(Continued)

*Primary Examiner* — Bradley King
(74) *Attorney, Agent, or Firm* — Nixon Peabody LLP; Jeffrey L. Costellia

(57) ABSTRACT

A vehicle air braking system having a source of fluid under pressure (1), an air dryer (A) downstream of the source (1), and an air consumer circuit (2) downstream of the air dryer (A), the system being operable to suspend the source (1) on demand to permit backflow of air under pressure from the air consumer circuit (2) through the air dryer (A) to a drain valve (B), the system including a regeneration valve (D), and a command valve (C) having an inlet connected to the air consumer circuit (2), and a supply outlet operably connected to the drain valve (B), wherein the regeneration valve (D) is operable to permit regeneration backflow in response to connection of the inlet and supply outlets of the command valve (C).

5 Claims, 4 Drawing Sheets

(56) References Cited

U.S. PATENT DOCUMENTS

| | | | |
|---|---|---|---|
| 5,378,266 A | | 1/1995 | Elamin |
| 5,427,609 A | * | 6/1995 | Zoglman et al. ............... 95/98 |
| 5,592,754 A | * | 1/1997 | Krieder et al. ............... 34/527 |
| 5,678,900 A | * | 10/1997 | Blanz ............... 303/6.01 |
| 5,884,895 A | * | 3/1999 | Wolz et al. ............... 251/54 |
| 6,098,967 A | | 8/2000 | Folchert |
| 6,332,623 B1 | | 12/2001 | Behmenburg et al. |
| 6,640,463 B1 | * | 11/2003 | Beck et al. ............... 34/527 |
| 7,103,991 B2 | * | 9/2006 | Moulding ............... 34/330 |
| 7,771,508 B2 | * | 8/2010 | Hilberer ............... 95/10 |

FOREIGN PATENT DOCUMENTS

| | | |
|---|---|---|
| DE | 39 23 882 C2 | 9/1990 |
| DE | 195 15 895 A1 | 10/1996 |
| DE | 196 20 851 C2 | 4/1997 |
| DE | 198 34 705 A1 | 2/2000 |
| EP | 0 808 756 A1 | 11/1997 |
| EP | 0 867 351 A1 | 9/1998 |
| JP | 58-012861 | 1/1983 |
| JP | 61-272479 | 12/1986 |

OTHER PUBLICATIONS

Patent Abstracts of Japan vol. 011, No. 379 (C-463), Dec. 10, 1987 & JP 62 149320 A (Nippon Air Brake Co Ltd), Jul. 3 1987 Abstract; Figure.

Patent Abstracts of Japan vol. 016, No. 190 (C-0937), May 8, 1992 & JP O4 027412 A (Tokico Ltd), Jan. 30, 1992 Abstract; Figure 2.

International Search Report Dated Jan. 17, 2002.

* cited by examiner

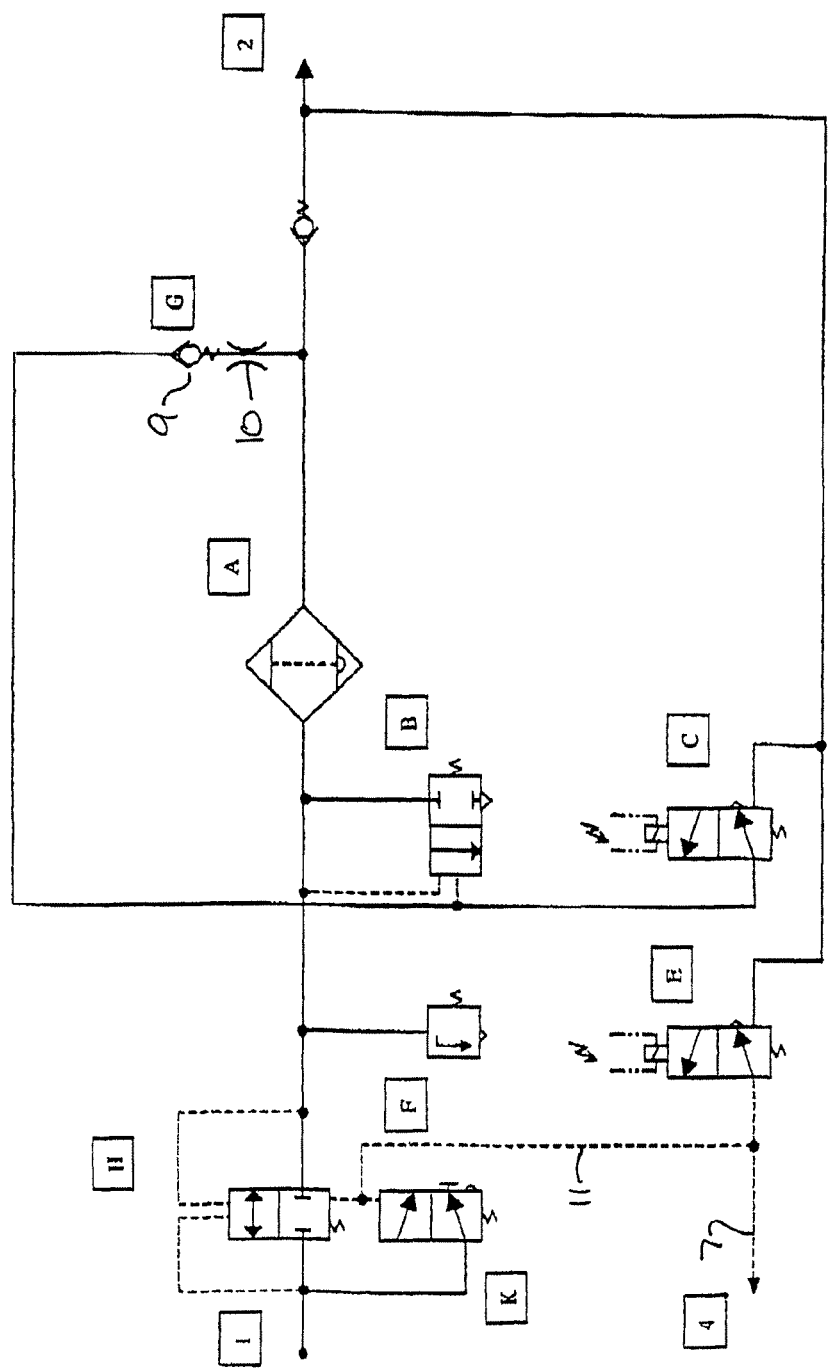

VEHICLE AIR BRAKING SYSTEM

This invention relates to air braking systems of vehicles.

In a conventional air braking system, air is supplied under pressure from a compressor through an air dryer and non-return valve to reservoir, from which air is drawn via a demand valve.

The air dryer typically consists of a container of desiccant, and is periodically regenerated by passing a small volume of dry air through the desiccant in reverse, and allowing this volume to exhaust to atmosphere.

In a simple system regeneration may occur when a pressure sensitive switch senses maximum pressure in the reservoir. This switch may cause a pressure signal to be applied to a regeneration valve which exhausts the air system upstream of the air dryer, a volume of dry air downstream of the air dryer being permitted to bypass the non-return valve via a restrictor. The opening of this regeneration valve may also connect the compressor outlet directly to exhaust, allowing the compressor to freewheel, or unloading of the compressor may be effected by a parallel system. As pressure downstream of the air dryer reduces to a minimum setting of the pressure relief valve, the regeneration valve closes, and the compressor is brought on load to recharge the reservoir.

Various proposals have been made to eliminate unnecessary pumping of the compressor, and to ensure regeneration of the air dryer only when necessary.

A known air braking system of a vehicle has a source of fluid under pressure, an air dryer downstream of said source, and an air consumer circuit downstream of the air dryer, and the system has control means to suspend the source on demand to permit backflow of air under pressure from the air consumer circuit through the air dryer to a drain valve. The control means comprises an electrically actuated command valve having an inlet connected to the air consumer circuit a supply outlet operably connected to the drain valve and an exhaust outlet. In use the valve is movable from a closed condition in which the outlets are connected, to an open condition in which the inlet and the supply outlet are connected, the drain valve being resiliently closed and movable from a closed condition to an open condition on connection of the inlet and supply outlet.

The source may be suspended by exhausting through said drain valve, but alternatively the supply outlet is operably connected to unloading means for directly unloading or suspending the source, so that the unloading means is operated when the inlet and supply outlet are connected.

Regeneration flow is initiated by an electrically actuable regeneration valve, and the regeneration and command valves are typically actuated simultaneously, so that opening of the drain valve coincides with regeneration backflow through the air dryer.

In a first aspect of the invention, the electrically actuable regeneration valve of the known air braking system is substituted by a regeneration valve operable to permit regeneration backflow in response to connection of the inlet and supply outlets of the command valve. Accordingly there is provided a vehicle air braking system having a source of fluid under pressure, an air dryer downstream of said source, and an air consumer circuit downstream of the air dryer, the system having control means to suspend the source on demand to permit backflow of air under pressure from the air consumer circuit through the air dryer to a drain valve, the control means comprising a regeneration valve, and a command valve having an inlet connected to the air consumer circuit, and a supply outlet operably connected to the drain valve, wherein the regeneration valve is operable to permit regeneration backflow in response to connection of the inlet and supply outlets of the command valve.

The drain valve may be resiliently biased to a closed position and movable from said closed position to an open position on connection of the command valve inlet and supply outlet. Similarly the regeneration valve may be spring biased to a closed position and connected to the supply outlet against movement of the closure spring. In such an embodiment the regeneration valve and the drain valve may preferably be connected to a common signal line leading from said supply outlet.

The control means may suspend the source by exhausting through the drain valve. Alternatively the system may include a compressor unloader, the source being suspendable via said compressor unloader. In such an embodiment the compressor unloader may be operable via an unloader valve, said unloader valve having an inlet connected to the air consumer circuit and an outlet connected to the compressor unloader, said valve being resiliently biased to a closed position and movable to an open position thereby connecting the inlet to the outlet. The unloader valve may be electrically operable.

This arrangement eliminates the need for electrical actuation of the regeneration valve, and ensures simultaneous operation of the drain and regeneration valves since they are responsive to a common signal source at the supply outlet.

In a second aspect, the known air braking system includes an electrically actuable unloader valve having an inlet connected to said air consumer circuit and movable from a closed to an open condition whereby said inlet is operably connected via an unloading outlet to means for directly unloading or suspending such source.

Such an arrangement provides controlled unloading using pressure in the air consumer circuit as the motive force.

In a third aspect of the invention regeneration flow may be via the command valve. In this arrangement the supply outlet of the command valve is connected via a non-return valve and fluid restrictor to a point just downstream of the air dryer. Thus on connection of the command valve inlet and supply outlet, the source of air pressure is suspended (by e.g. opening of the drain valve) and at the same time air pressure is fed from the consumer circuit via the supply outlet for backflow through the air dryer, to exhaust through the drain valve.

This arrangement has the advantage that a simple non-return valve and restrictor replaces the usual regeneration valve.

The air pressure source may of course be suspended directly by means of the electrically actuable unloader value of the second aspect.

In yet another aspect, the system may include an exhaust valve between said source and said air drier whereby said source can be directly exhausted, said exhaust valve being operable by connection to the supply outlet of the unloader valve of the second aspect.

Other aspects of the invention will be apparent from the following description of several preferred embodiments shown by way of example only in the accompanying drawings in which:

FIG. 4 is a schematic illustration of a third embodiment of the invention.

Figure 1:
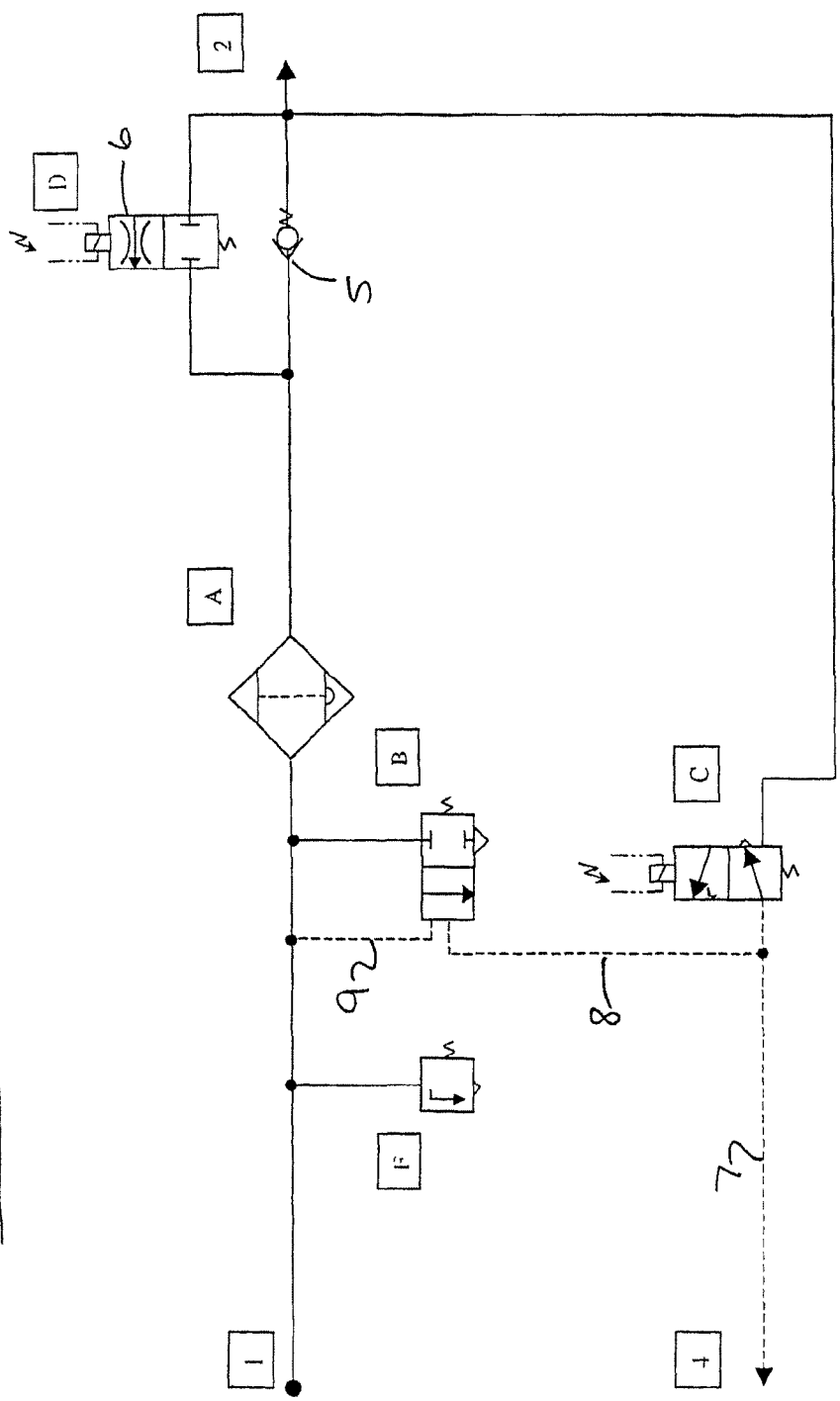
FIG. 1 is a schematic illustration of an existing air circuit of a vehicle.

A conventional system is illustrated in FIG. 1.

A compressor 1 supplies air under pressure via an air dryer A through a non-return valve 5 to an air system 2.

A conventional pressure relief valve F vents the compressor supply line in the event of a maximum pressure being reached.

An electrically actuated regeneration valve D is closed by a spring, but can be opened to permit backflow of air from the air system 2 to the air dryer A via a restrictor 6.

An electrically actuated command valve C is also closed by a spring, in which condition a signal line 7 to a compressor unloader 4 is vented in an exhaust outlet.

A dump valve B for the system upstream of the air dryer A is normally closed by a spring, but can be opened on application of sufficient pressure in signal line 8. Another signal line 9 also permits venting via the dump valve B in the event that system pressure exceeds a predetermined maximum.

In use the compressor 1 charges the air system 2 via the air dryer A. When maximum pressure in the system 2 is reached the command valve C may be actuated electrically to cause a signal pressure to pass in a supply outlet to signal line 8. This signal causes the dump valve B to open, thus connecting the compressor to exhaust and allowing it to freewheel against the small resistance imposed by the system pipework upstream of the dump valve B. The signal line 7 is optional, and causes direct operation of a compressor unloader 4 (for example a cylinder head valve), thus eliminating the pumping losses imposed by pipework upstream of dump valve B. Use of air in the system 2 may cause sufficient pressure drop to cause command valve C to be deactivated, in which case pressure in signal line 7, 8 is exhausted by connecting the supply and exhaust outlets, and the compressor is consequently brought on-load.

The means for sensing pressure in the system 2 is conventional, and for example comprises a pressure switch having maximum and minimum settings corresponding to compressor 'on' and compressor 'off' valves.

When regeneration of the air dryer is required, both valves C and D are energised. The compressor is unloaded and dump valve B opens. Air under pressure is permitted to bleed back through restrictor 6, thus removing moisture from the air dryer A to exhaust.

Valve D may be closed according to any desirable system parameter, such as pressure drop, time, humidity of exhausted air, etc.

This relatively simple system provides control of regeneration by the use of electrically actuated valves C, D.

Figure 2:
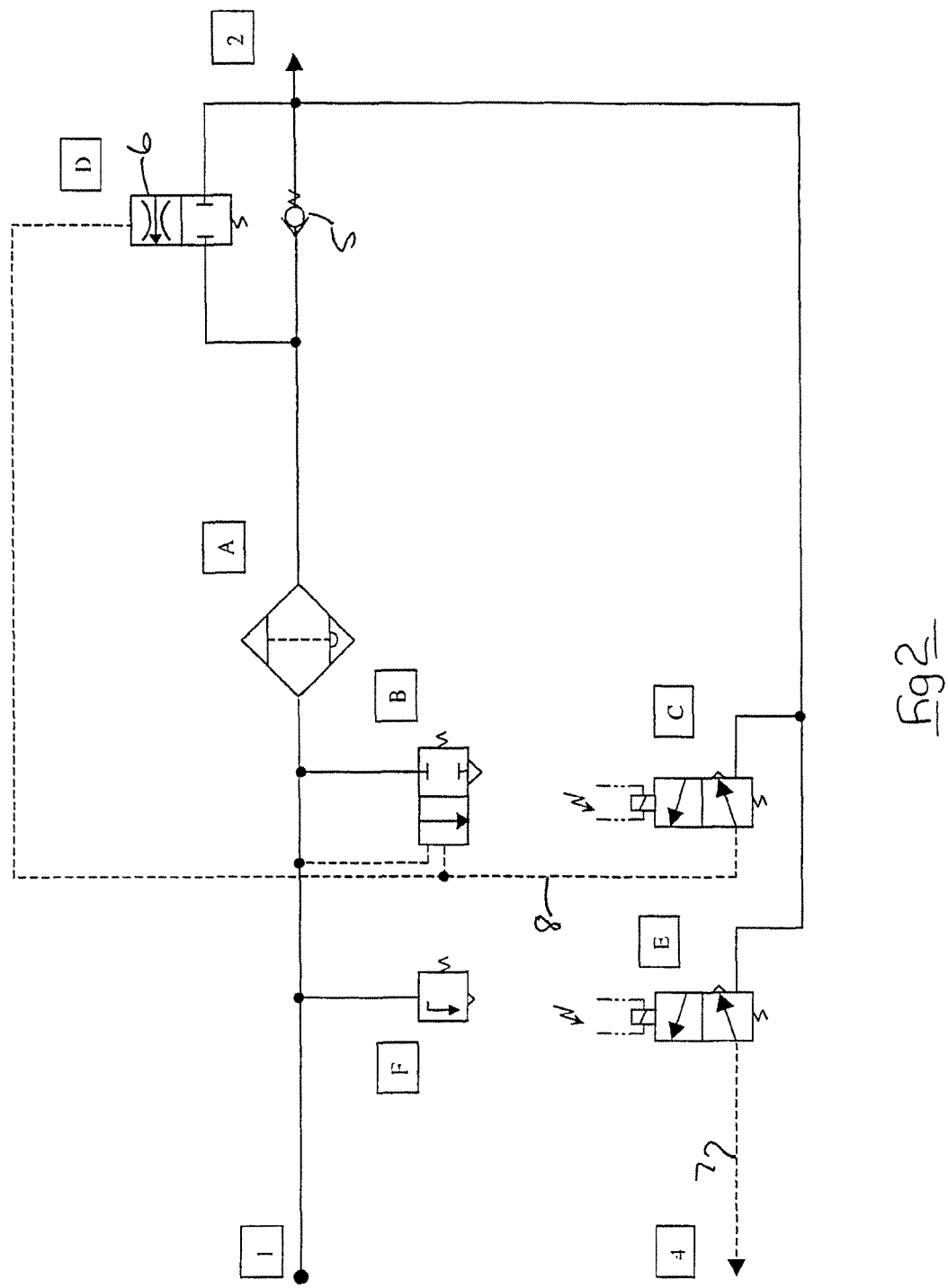
FIG. 2 is a schematic illustration of a first embodiment of the invention.

An improved air system according to the invention is illustrated in FIG. 2; components corresponding to FIG. 1 have the same references and functionality.

In the system of FIG. 2 the regeneration valve D is actuated by pilot pressure in signal line 8. The unloader signal line 7 is under the control of an independent electrically actuated unloader valve E, the command valve C and the unloader valve E being arranged on a common flow line extending from a position downstream of the non-return valve 5 and upstream of the air system 2 as shown in FIG. 2.

The arrangement permits an unloader signal to be generated by electrical actuation of valve E. Dump valve B remains closed, and accordingly air under pressure between the compressor and the air dryer is not exhausted. As a result, when the compressor is brought on-load, there is no need to fill the system upstream of the non-return valve 5, and accordingly system response time is improved along with a saving of energy.

Electrical actuation of command valve C causes a pilot pressure to both open the dump valve B and the regeneration valve D, and regeneration occurs as previously described.

Figure 3:
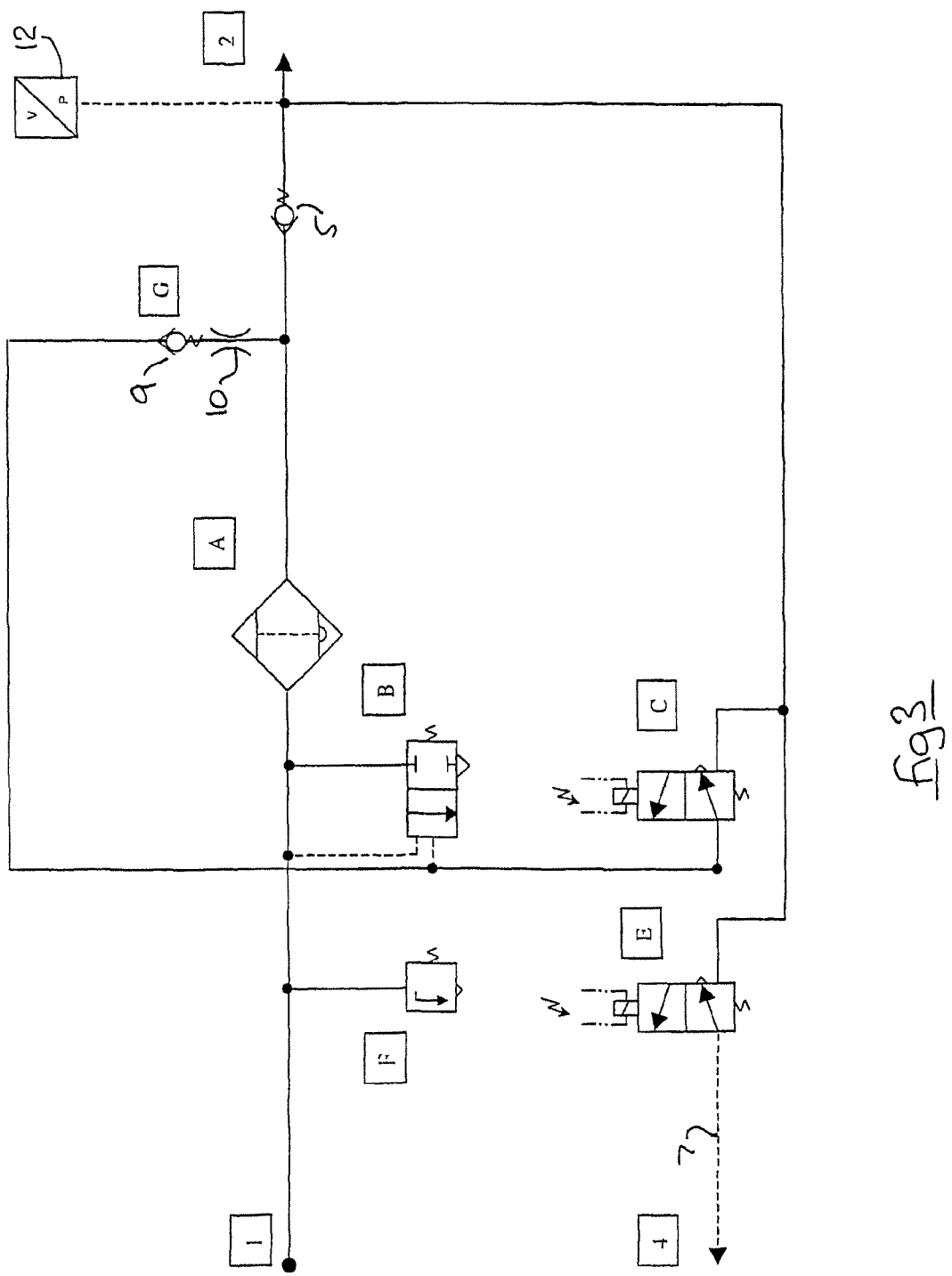
FIG. 3 is a schematic illustration of a second embodiment of the invention.

A second system according to the invention is illustrated in FIG. 3. Again the same references are used for components having the same functionality.

The compressor can be unloaded independently, as described in connection with FIG. 2. However the command valve C directly supplies fluid under pressure via an assembly G, comprising a non-return valve 9 and restrictor 10, to a point downstream of the air dryer A. Thus when regeneration is required, valves C and E are actuated, both to open the dump valve B and to permit regeneration air flow via command valve C. This arrangement replaces the relatively expensive regeneration valve D with a simple non-return valve and restrictor.

FIG. 3 also illustrates a pressure voltage transducer 12 for generating an electrical signal voltage proportional to system pressure. Such a signal voltage can be used in all of the embodiments to determine operation of the electrically actuated valves C, D, E.

A third system according to the invention is illustrated in FIG. 4 and is adapted to certain types of compressor that cannot tolerate a downstream pressure when unloaded. This system is similar to that of FIG. 3, and common components carry the same references.

The compressor 1 supplies air under pressure to the air dryer A via a shut off valve H. A drain valve K is operable to connect the portion of the circuit between the compressor and valve H to exhaust.

As illustrated, the circuit is passive, valves H and K being urged to an end position by respective return springs. Increasing compressor pressure acts as a pilot on the top (as viewed) of valve H, and at a predetermined minimum pressure this valve opens to supply air under pressure to the air dryer A.

At the cut-off pressure, valve E is electrically activated to apply a signal pressure to signal line 7 to unload the compressor. A signal pressure is also applied to signal line 11 whereby drain valve K is urged to an open condition, and shut off valve H is urged to the closed condition. The output port of the compressor 1 is thus open to exhaust via valve K, but pressure downstream of valve H is maintained. This arrangement allows a quicker pump up of the system since not all of the pressurised air between the compressor and air dryer is lost during compressor unloading. Regeneration of the air dryer is as described in relation to FIG. 3, valves C and E being electrically actuated at the same time.

What is claimed is:

1. A vehicle air braking system comprising:
   a source of fluid under pressure,
   an air dryer downstream of said source,
   an air consumer circuit downstream of the air dryer,
   control means to suspend the source on demand to permit backflow of air under pressure from the air consumer circuit through the air dryer to a drain valve, the control means comprising a regeneration valve,
   a command valve comprising an inlet connected to the air consumer circuit,
   a supply outlet operably connected to the drain valve,
   a compressor unloader the source being suspendable via said compressor unloader, the compressor unloader being operable via an unloader valve, said unloader valve comprising an inlet connected to the air consumer circuit and an outlet connected to the compressor unloader, and
   an electrical actuator operably connected to the unloader valve,
   wherein the regeneration valve is operable to permit regeneration backflow in response to connection of the inlet and supply outlets of the command valve, wherein the regeneration valve is connected to the command valve by a pilot pressure line, wherein the regeneration valve is openable in response to connection of the inlet and supply outlets of the command valve, and wherein the system is configured so that when an unloader signal is generated by electrical actuation of the unloader valve, the drain valve remains closed, and air under pressure between the source of fluid under pressure and the air dryer is not exhausted.

2. A vehicle air braking system as claimed in clam 1 wherein the drain valve is resiliently biased to a closed position and movable from said closed position to an open position on connection of the command valve inlet and supply outlet.

3. A vehicle air braking system as claimed in claim 1 wherein the regeneration valve is spring biased to a closed position and connected to the supply outlet against movement of the closure spring.

4. A vehicle air braking system as claimed in claim 2 wherein the regeneration valve and the drain valve are connected to a common pilot line leading from said supply outlet.

5. A vehicle air braking system as claimed in claim 1 wherein said unloader valve is resiliently biased to a closed position and movable to an open position thereby connecting the inlet to the outlet.

* * * * *